(12) United States Patent
Moskalik et al.

(10) Patent No.: US 7,108,016 B2
(45) Date of Patent: Sep. 19, 2006

(54) LIGHTWEIGHT LOW PERMEATION PISTON-IN-SLEEVE ACCUMULATOR

(75) Inventors: Andrew J. Moskalik, Detroit, MI (US); Charles L. Gray, Jr., Pinckney, MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 0 days.

(21) Appl. No.: 11/074,147

(22) Filed: Mar. 7, 2005

(65) Prior Publication Data

US 2005/0194054 A1    Sep. 8, 2005

Related U.S. Application Data

(60) Provisional application No. 60/551,271, filed on Mar. 8, 2004.

(51) Int. Cl.
*F16L 55/04*    (2006.01)

(52) U.S. Cl. .............................. 138/31; 138/30; 138/26; 220/721

(58) Field of Classification Search .................. 138/30, 138/31, 26
See application file for complete search history.

(56) References Cited

U.S. PATENT DOCUMENTS

| | | | | |
|---|---|---|---|---|
| 2,417,873 A | * | 3/1947 | Huber | 138/31 |
| 2,703,108 A | * | 3/1955 | McCuistion | 138/31 |
| 2,715,419 A | * | 8/1955 | Ford et al. | 138/31 |
| RE24,223 E | * | 9/1956 | Ford et al. | 138/31 |
| 3,158,180 A | * | 11/1964 | Greer | 138/31 |
| 3,692,368 A | * | 9/1972 | Alexander | 305/146 |
| 3,863,676 A | * | 2/1975 | Tarsha | 138/31 |
| 4,177,837 A | * | 12/1979 | Frank et al. | 138/31 |
| 4,561,568 A | * | 12/1985 | Hoffmeister et al. | 222/130 |
| 4,714,094 A | * | 12/1987 | Tovagliaro | 138/31 |
| 6,527,012 B1 | | 12/2000 | Weber | |

* cited by examiner

*Primary Examiner*—Patrick Brinson
(74) *Attorney, Agent, or Firm*—David H. Read

(57) ABSTRACT

A lightweight, low permeation, piston-in-sleeve high pressure accumulator is provided. The accumulator includes a cylindrical composite pressure vessel with two integral rounded ends. A piston slidably disposed in a thin nonpermeable internal sleeve in the accumulator separates two chambers, one adapted for containing a working fluid and the other adapted for containing gas under pressure. Working fluid is provided in a volume between the nonpermeable internal sleeve and the composite pressure vessel wall. Further means are provided for withstanding harmful effects of radial flexing of the composite vessel wall under high pressures, and from stresses present in use in mobile applications such as with a hydraulic power system for a hydraulic hybrid motor vehicle. A method for pre-charging the device is also presented.

15 Claims, 5 Drawing Sheets

LIGHTWEIGHT LOW PERMEATION PISTON-IN-SLEEVE ACCUMULATOR

CROSS-REFERENCE TO RELATED APPLICATION

This application claims priority from U.S. Provisional Application No. 60/551,271, of the same name, filed on Mar. 8, 2004.

BACKGROUND OF THE INVENTION

1. Field of the Invention

This invention relates generally to accumulators for high pressure applications, and more particularly to high pressure accumulators of the piston-in-sleeve (or "piston and sleeve") type. This invention further relates to the potential use of such accumulators in conjunction with fuel efficient hydraulic hybrid motor vehicles.

2. Description of the Related Art

1. Hydraulic Hybrid Vehicles

Hybrid powertrains are an increasingly popular approach to improving the fuel utilization of motor vehicles. "Hybrid" refers to the combination of one or more conventional internal combustion engines with a secondary power system. The secondary power system typically serves the functions of receiving and storing excess energy produced by the engine and energy recovered from braking events, and redelivering this energy to supplement the engine when necessary. This frees the internal combustion engine to operate more efficiently, while the secondary power system acts in concert with it to make sure that enough power is available to meet road load demands and any excess power is stored for later use.

Several forms of secondary power systems are known in the art. For example, various electrical systems, such as batteries and electric motor/generators, are becoming popular in commercial applications. Recently, however, hydraulic power systems have been demonstrated to have comparable or even better efficiency, while offering potential advantages in power density, cost, and service life. A hydraulic power system takes the form of one or more hydraulic accumulators for energy storage and one or more hydraulic pumps, motors, or pump/motors for power transmission. Hydraulic accumulators operate on the principle that energy may be stored by compressing a gas. An accumulator's pressure vessel contains a captive charge of gas, typically nitrogen, which becomes compressed as a hydraulic pump pumps liquid into the vessel. The liquid thereby becomes pressurized and when released may be used to drive a hydraulic motor. A hydraulic accumulator thus utilizes two distinct working media, one a compressible gas and the other a relatively incompressible liquid. Throughout this document, the term "gas" shall refer to the gaseous medium and the term "fluid" shall refer to the liquid working medium, as is customary in the art.

U.S. Pat. No. 5,495,912 ("Hybrid Powertrain Vehicle") and U.S. Pat. No. 6,719,080 ("Hydraulic Hybrid Vehicle") provide additional context on the role of hydraulic accumulators in hydraulic hybrid powertrains, as well as detailed descriptions on the preferred series and parallel hydraulic hybrid motor vehicle configurations for use with the accumulator of the present invention, and are therefore incorporated herein by reference in their entirety.

2. High Pressure Accumulator Design Considerations—Permeation

Care must be taken in the design of a high pressure accumulator to minimize the extent to which the gaseous medium mixes with and dissolves within the hydraulic fluid. The dissolution of gas molecules in hydraulic fluid may cause several significant problems, particularly in a hydraulic hybrid vehicle application. For example, when highly pressurized fluid is discharged from the accumulator to drive a hydraulic motor, the fluid pressure will drop rapidly and dramatically (e.g., from 5000 psi to 100 psi in less than one second) as the fluid flows through the motor. Such a pressure drop causes any dissolved gas present in the fluid to immediately come out of solution and form small bubbles or gas pockets. As the depressurized fluid is discharged from the motor, the gas travels with it, generally into a low pressure accumulator (or reservoir) where the fluid is stored until needed again. A significant quantity of gas may thus over time become trapped in the low pressure accumulator. Although it is possible to develop means to vent the gas after it collects at the fluid surface in the low pressure accumulator, the loss of this gas would nevertheless also represent a gradual depletion of the gas pre-charge of the high pressure accumulator and thus would lead to the need for occasional gas recharging (which would not be a desirable result for consumers, particularly for use in a motor vehicle application). In addition, such gas in the low pressure accumulator may also become entrained as bubbles or gas pockets in fluid that is later pumped back out, causing the pump to experience potentially damaging effects such as cavitation or torque fluctuations. Further, the accumulating volume of gas reduces the effective fluid capacity of the low pressure accumulator.

Systems that operate at very high pressures are particularly vulnerable to all of these difficulties because high pressures encourage greater dissolution of gas in the fluid, and the greater degree of pressure drop increases the rate at which gas comes out of solution.

Prior art high pressure accumulator designs therefore go to great lengths to minimize gas dissolution and ensure physical separation of the charge gas from the fluid. Several separation means are known, including the use of an elastic bladder or diaphragm, a flexible bellows, or a piston in a cylinder. However, thus far prior art separation means do not minimize gas dissolution to the degree that would be preferred in a commercially acceptable hydraulic hybrid vehicle. Such an application calls for a high pressure system that is preferably "closed," that is, capable of operating indefinitely without frequent adjustment of gas or fluid levels in the accumulator.

3. High Pressure Accumulator Designs in the Present State of the Art

In the present state of the art, most commonly available accumulators employ an elastic bladder. Although the pressure in the hydraulic fluid on one side of the bladder is generally the same as the pressure of the compressed gas on the other side of the bladder, molecules of gas tend to permeate through the bladder and dissolve in the fluid, seeking an equilibrium concentration. Some elastic bladder materials have properties that minimize permeation, but due to the molecular nature of elastomers, permeation cannot be eliminated completely. In addition, permeation resistant, flexible coatings such as poly-vinyl alcohol can be, used on the gas side of the bladder, but even with such coatings the permeation level is still unacceptable at high pressures.

Some success has been achieved by replacing the elastic bladder with a flexible metallic or metallic-coated bellows structure. For example, the inventions disclosed in U.S. Pat. No. 5,771,936 granted to Sasaki et al. (1998) and U.S. Pat. No. 6,478,051 to Drumm et al. (2002) depict such a bellows. However, a principal shortcoming of this approach lies in the potential for the bellows to experience stresses and longitudinal disorientation that would soon lead to failure under a severe duty cycle, such as would be present in an automotive power system application.

Standard piston accumulators are also well represented in the art. In a standard piston accumulator, the hydraulic fluid is separated from the compressed gas by means of a piston which seals against the inner walls of a cylindrical pressure vessel and is free to move longitudinally as fluid enters and leaves and the gas compresses and expands. Because the piston does not need to be flexible, it may be made of a gas impermeable material such as steel. However, the interface between the piston and the inner wall of the cylinder must be controlled tightly to ensure a good seal, and the degree of dimensional tolerance necessary to ensure a good seal increases the cost of manufacturing. It also requires that the pressure vessel be extremely rigid and resistant to expansion near its center when pressurized, which would otherwise defeat the seal by widening the distance between the piston and cylinder wall. This has eliminated the consideration of composite materials for high pressure piston accumulator vessels, as composite materials tend to expand significantly under pressure (e.g., about 1/10 of an inch diametrically for a 12 inch diameter vessel at 5,000 psi pressure). Furthermore, the need to assemble the cylinder with a piston inside traditionally requires that the cylinder have at least one removable end cap for use in assembly and repair, rather than the integral rounded ends that are more structurally desirable in efficiently meeting pressure containment demands. Composite pressure vessels are not constructed effectively with removable end caps.

As a result of the foregoing, standard piston accumulator vessels tend to be made of thick, high strength steel and are very heavy. Standard piston accumulators have a much higher weight to energy storage ratio than either steel or composite bladder accumulators, which makes them undesirable for mobile vehicular applications (as such increased weight would, for example, reduce fuel economy for the vehicle). More specifically, piston accumulators for the same capacity (i.e., size) and pressure rating are many times heavier (e.g., by up to 10 times) than an accumulator with a lightweight composite pressure vessel design, as would be preferred in such applications where accumulator weight is an issue. Therefore, despite their potentially superior gas impermeability, piston accumulators are largely impractical for vehicular applications.

4. Prior Art Regarding Piston-in-Sleeve Accumulator Designs

One piston accumulator concept, considered, for example, for military aircraft applications, utilizes a piston and sleeve assembly, in which the piston resides within and seals against a cylindrical sleeve that is separate from the inner wall of the pressure vessel. This piston-in-sleeve approach provides at least two benefits over the prior art for high pressure accumulators, namely (i) separating the pressure containment function of the vessel wall from its piston sealing function, allowing an effective seal to be pursued with a sleeve independently of issues relating to pressure vessel construction, and (ii) providing an intervening (aka "interstitial") volume between the sleeve and vessel wall which may be filled with the charge gas to provide a safety factor against explosion in the event of puncture of the pressure vessel (e.g., by a bullet in military combat). U.S. Pat. No. 2,417,873 (Huber 1947), U.S. Pat. No. 2,703,108 (McQuistion 1955), U.S. Pat. No. Re24,223 (Ford 1956), and later U.S. Pat. No. 4,714,094 (Tovagliaro 1987) each teach the use of a piston and sleeve assembly on a high pressure accumulator. Such designs comprise a generally thickwalled strong cylindrical pressure vessel constructed of a steel alloy, and a metal sleeve which is thin relative to the vessel walls. The sleeve is permanently attached to the inner surface of one end of the pressure vessel near its circumference, creating (with the piston) a closed or "inside" chamber for the working fluid. The other end of the sleeve extends toward the other end of the vessel and is generally left open to create an "outside" chamber that consists of the open volume of the sleeve, the remaining volume of the pressure vessel, and the intervening/interstitial space between the outer wall of the sleeve and the inner wall of the pressure vessel, each filled with the gaseous medium of the accumulator.

In operation of these prior art piston-in-sleeve accumulator designs, the sleeve must be tightly retained and centered within the vessel to prevent radial movement, for example, due to vibrations in use with mobile (e.g. aircraft) applications. Sleeve movement would fatigue the rigid fixed end of the sleeve possibly leading to leakage due to cracking, distortion, or wear of the sealing gasket if one is present. This requires the sleeve to either be stiffened by connecting it at points to the vessel wall, or requires the sleeve to be thicker than the minimum that would be necessary to withstand the small pressure differentials normally encountered in charging and discharging. Further, the outer walls of the vessel must be thicker than would be necessary for pressure containment alone because the walls must be prevented from expanding and thus loosening the sleeve or distorting it from the true circular form necessary for piston sealing.

Prior art piston-in-sleeve designs also uniformly contain the fluid within the closed (inside) chamber, with the charge gas residing on the other side of the piston and in the interstitial space between the sleeve and vessel wall. This fluid-inside, gas-outside arrangement is used in the prior art for at least two reasons. First, as mentioned above, the prior inventors sought a resistance to structural splitting if a bullet or shrapnel were to enter the fluid side during military combat. With the charge gas residing in the interstitial space at the cylindrical periphery of the vessel, the displacement caused by the bullet would be largely absorbed by compression of the gas in this space. Second, this arrangement is naturally preferable because it maximizes the fluid capacity and hence energy capacity of the device. That is, the working medium that resides inside the sleeve may be discharged completely, while some portion of the medium outside the sleeve will always remain trapped in the interstitial space; because working capacity is determined by how much fluid may be discharged, it is a natural choice to have the fluid reside on the inside of the sleeve and gas on the outside.

Like standard piston accumulators discussed above, these prior art piston-in-sleeve accumulators are unacceptably heavy for a hydraulic hybrid motor vehicle application or other application where accumulator weight is a significant issue. Notably, U.S. Pat. No. 4,714,094 (Tovagliaro 1987) attempts to reduce the weight of such piston-in-sleeve accumulators through the use of lightweight composite materials in place of steel for the pressure containment function in the vessel wall. However, the Tovagliaro device still requires an internal metallic core to the vessel wall (in addition to the composite envelope, likely at least in part to resist permeation of the gas under pressure out through the composite vessel wall) and a thickened metal area at one (flat) end of the accumulator (to enable providing a removable end cap and to tightly retain and center the sleeve, as discussed above). As such, the Tovagliaro device would still remain undesirably heavy for a hydraulic hybrid motor vehicle application, and would also entail significantly greater manufacturing cost than desired (e.g., because of complexity of the design and entailing vessel construction with both a composite envelope and metallic core and end). In addition, the internal metallic core (or liner) used in conjunction with composite materials would be unacceptable for use in hydraulic hybrid vehicles. The intense duty cycle experienced by the accumulator (i.e., the extremely large number of charge-discharge cycles, in some cases exceeding one million cycles) and the significant radial expansion of composite materials (about 1/10 of one inch diametrically for a 12 inch diameter vessel at 5,000 psi pressure) together would result in expected fatigue failure of the metal core or liner.

In addition, the flat end construction (on at least one end) of prior art piston accumulators also adds significantly to the complexity, weight and cost of the accumulator.

5. Disadvantages of the Prior Art

In summary, as has been explained above, despite the many years of development for accumulator designs, the prior art has thus far failed to provide a high pressure accumulator design that is lightweight, low cost, durable under stresses, and does not have permeation difficulties at high fluid pressures. Prior art bladder accumulators have unacceptable permeation. Prior art metal bellows accumulators are not sufficiently durable under stresses. Prior art piston accumulators of all types are unacceptably heavy and costly. As a result, the prior art has failed to provide a high pressure accumulator that is satisfactory for hydraulic hybrid motor vehicle applications, as is desired for the present invention.

SUMMARY OF THE INVENTION

The object of the present invention is to provide a high pressure piston and sleeve accumulator design that is lightweight, adaptable to service in mobile vehicles, and can be mass produced at low cost, while maintaining or exceeding the superior low gas permeability properties of state of the art prior art piston accumulators.

The present invention utilizes a piston and sleeve design, but through various means enables use of a thoroughly lightweight and easy to manufacture composite pressure vessel therewith, thereby providing a lightweight low permeation high pressure accumulator and satisfying a long felt need for such an accumulator in the art. As will be described in greater detail hereafter, applicant meets these needs through one or more of various modifications from the piston accumulator prior art, including placing working fluid instead of charge gas between the sleeve and vessel wall, assembling and using the piston-in-sleeve device with domed vessel ends and without the aid of removable end caps, using fatigue-resistant plastic internal liner material, and/or providing means to withstand harmful effects of radial flexing of the composite vessel wall at high pressures.

DETAILED DESCRIPTION OF THE INVENTION

Figure 1:
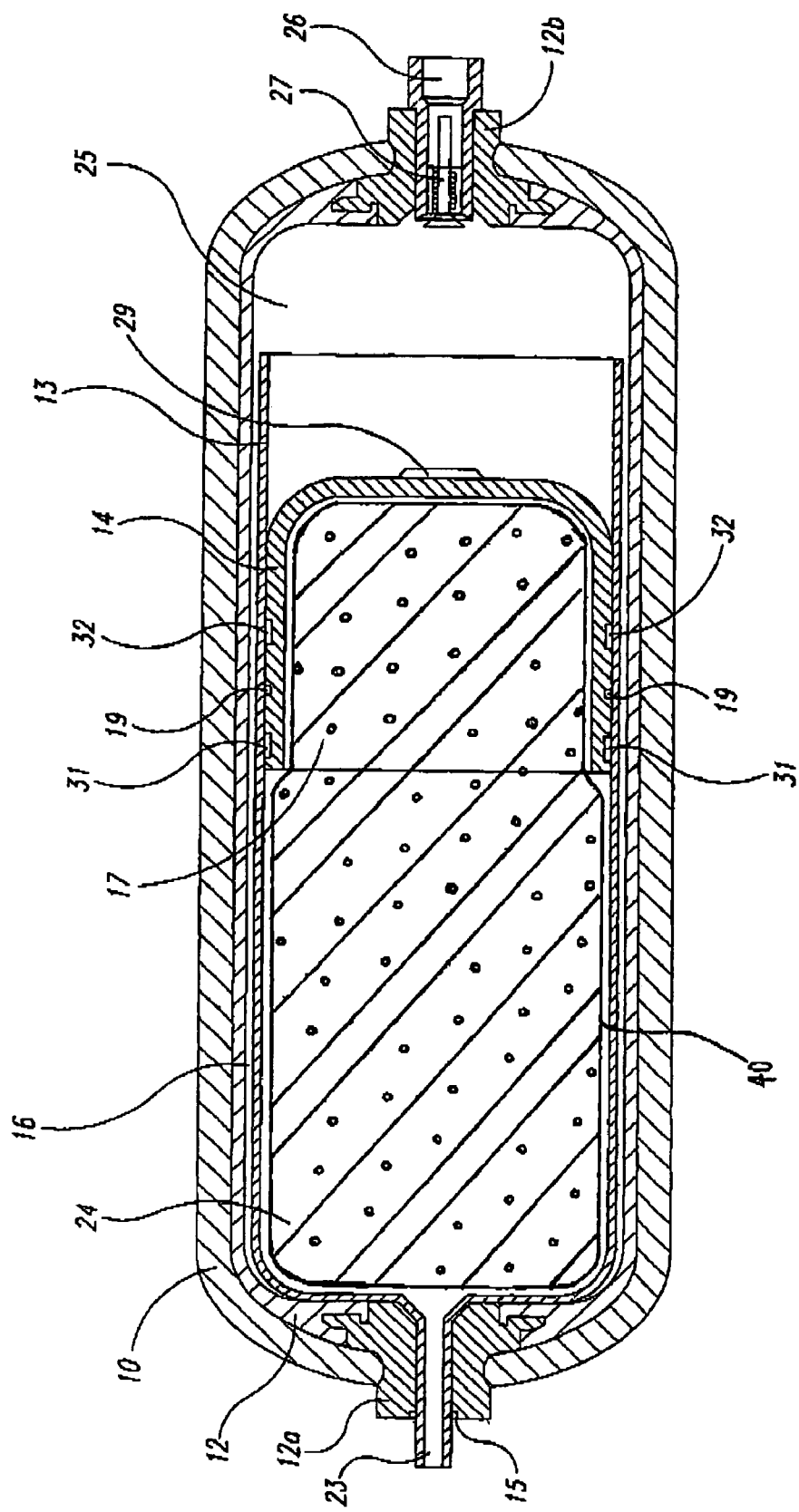
FIG. 1 shows a sectional view of a preferred embodiment of the invention.

With reference to FIG. 1, depicting a preferred embodiment of the invention, a lightweight composite cylindrical outer pressure vessel 10 with rounded ends is presented. Suitable materials for vessel 10 comprise carbon fiber wrap, E-glass, or one of many other strong and lightweight materials, such as may be found for high pressure bladder accumulators of the prior art. Suitable materials for vessel 10 may include materials that are gas-permeable at high pressures (e.g., 5000 psi). Vessel 10 is preferably lined with a thin liner 12 made of fatigue-resistant plastic, but may also be made of HDPE or other suitable material, as will also be understood in the art. Metal end bosses 12a and 12b reside at the ends of the vessel 10 to provide access to the interior of the vessel and are preferably embedded within liner 12, if liner 12 is provided.

Non-permeable sleeve unit 13 resides within vessel 10 (and liner 12 if provided), and is thin relative to the wall of pressure vessel 10. Sleeve unit 13 is preferably welded to metal end boss 12a by means of a weld joint such as that depicted in the position of weld 15, or at a similar location such as at other points on the interior of metal end boss 12a. Other joining means (for example, a threaded connection with an appropriate sealing means) may alternatively be employed.

Charge gas port 23 communicates with inner working medium chamber 24. Hydraulic fluid port 26 communicates with outer working medium chamber 25, which includes interstitial volume 16 between sleeve 13 and liner 12 (or if no liner, between sleeve 13 and cylinder wall 10). Shutoff valve 27 resides in port 26 and acts to close port 26 as the fluid volume approaches zero. Piston 14 slidably contained within sleeve 13. The inner working medium chamber 24 formed by piston 14 and sleeve 13 is filled with charge gas at a pressure typical of the art. Chamber 24 may also contain foam 40 to avoid heat increase in chamber 24 as the charge gas is compressed, as will be understood in the art. The addition of foam 40 in chamber 24 may also be utilized to provide structural support for sleeve 13 if desired. Outer chamber 25 is filled with hydraulic fluid.

As is known in the art, as hydraulic fluid enters and exits via port 26, piston 14 will move longitudinally within sleeve 13 in reaction to forces resulting from the balancing of pressure between the gas in chamber 24 and the fluid in chamber 25. Charge gas is prevented from contacting the fluid by means of piston seal 19. Slider bearings 31 and 32 preferably encircle piston 14 and act to facilitate its longitudinal movement within sleeve 13.

Figure 5:
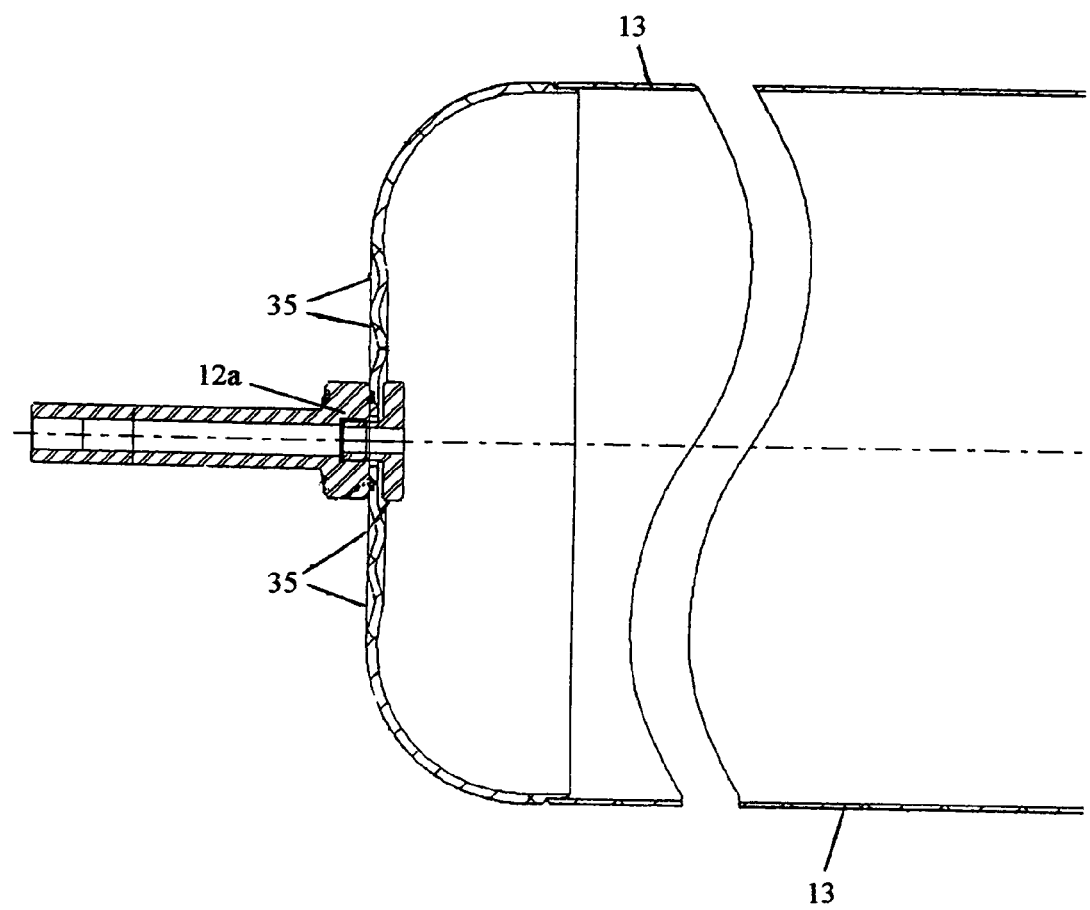
FIG. 5 presents an alternative embodiment for the piston sleeve of the present invention, utilizing S-shaped transitions through areas of stress on the piston sleeve.

Flexing of the composite pressure vessel causes stress on the area of the sleeve near its attachment to the pressure vessel. Using gas within the closed chamber 24 within the sleeve 13, instead of fluid as in prior art piston/sleeve accumulators, reduces this stress because of the lighter weight of gas than fluid. Sleeve 13 of the present invention additionally preferably contains a finite element analysis (FEA) engineered fatigue resistant, flexing end-dome section between the cylindrical portion of sleeve 13 and its attachment to metal end boss 12*a*, to assure fatigue resistance associated with sleeve radial movement in response to vibrations (e.g., in vehicle travel). The preferred example of such an end-dome uses classic "S shape" transitions 35 through areas of high stress for the sleeve, as shown in FIG. 5 and as will be known and understood in the art.

A preferred method to prepare the accumulator for operation begins by introducing fluid working medium into chamber 25 through fluid port 26 so as to cause interstitial space 16 and chamber 25 (which may be larger or smaller than depicted depending on the position of piston 14) to fill entirely with fluid to the exclusion of any residual gases that may be present from manufacturing and assembly. A charge gas such as nitrogen is then introduced through gas charge port 23 at a designated pre-charge pressure, perhaps for example 1000 psi. The pressure of the initial gas charge will cause piston 14 to move longitudinally toward the opposite end of the vessel, expelling fluid from chamber 25 as the piston sweeps through it. Valve bumper 29 will eventually exert pressure on shutoff valve stem 27 causing fluid port 26 to close and fluid to cease exiting. Fluid will continue to be present in interstitial space 16 and represents a volume of non-working fluid that will always be present in this space. To retain the charge gas, charge port 23 is sealed by conventional gas valve means as is known in the art. In this manner the accumulator is brought to its proper pre-charge pressure. To store energy in the accumulator, fluid is pumped into chamber 25 through valve port 26 by a hydraulic pump/motor or other means as is known in the art. Also as known in the art, this causes charge gas in chamber 24 to become compressed as fluid causes piston 14 to move into it.

As pressure inside the accumulator increases to very high levels in operation, perhaps 5000 psi, 7000 psi, or more, the pressure vessel 10 will exhibit a natural tendency to expand slightly in diameter, particularly near its center. This causes the interstitial volume 16 between pressure vessel/liner wall 12 and sleeve 13 to increase. In response, fluid will flow into interstitial space 16 causing pressure to balance across sleeve 13. Because pressure is balanced among interstitial space 16, gas chamber 24, and fluid chamber 25, little if any force is exerted on sleeve 13. Also, because sleeve 13 is not radially connected to pressure vessel wall 10 or liner 12, and the fluid in the interstitial space is relatively incompressible (as opposed to a compressible gas), the vessel's radial expansion does not exert any distortive force on sleeve 13 or result in any change of position of sleeve 13. In this way sleeve 13 maintains a good seal with piston 14 despite the vessel's moderate radial expansion under pressure.

Utilizing oil instead of gas in the interstitial space 16 outside of the sleeve 13 in the present invention avoids gas loss problems that would otherwise occur from an attempted use of composite pressure vessel 10 in a high pressure accumulator of this type, as the gas is thus contained solely within 24 surrounded by non-permeable sleeve 13 and piston 14. Fluid (unlike gas) will not permeate from interstitial space 16 through composite pressure vessel 10 at high pressures, thus also eliminating the necessity for a non-gas-permeable metallic barrier between space 16 and composite vessel 10. Maintaining gas on the inside of sleeve 13 away from vessel wall 10 also reduces heat transfer from the compressed gas to outside of the vessel, therefore providing some reduction in overall energy loss for the system.

As an additional embodiment, supposing that sleeve 13 is made of a deformable material such as (for example) a semi-rigid plastic, piston 14 may take on the additional role of shaping the cross sectional area of sleeve 13 so as to cause it to conform to the shape of piston 14, thus ensuring a good seal regardless of any local deformations in the sleeve at points not in contact with the piston.

Figure 2:
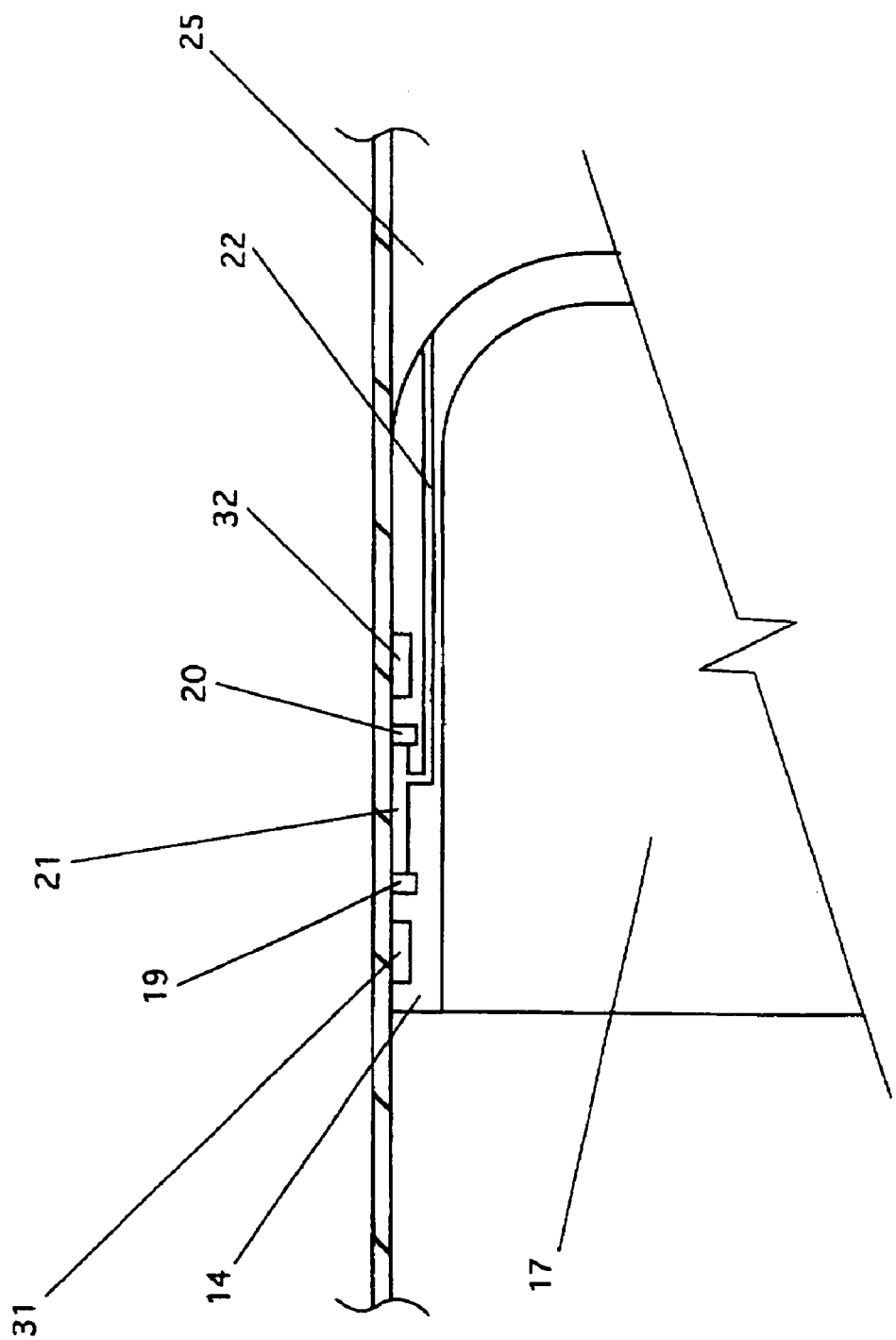
FIG. 2 depicts an alternate embodiment of the invention, in which the piston has an oil- or grease-filled double seal that is pressure balanced by means of a pressure balancing channel filled with grease.

FIG. 2 depicts an alternative embodiment of the piston used with the invention, employing a dual seal design for the piston. Piston 14 is encircled by seals 19 and 20, which are separated by an oil- or grease-filled space 21 that also encircles the piston. The dual seals provide additional anti-permeation sealing above that of the single seal of the previous embodiment. Because the oil in oil-filled space 21 must be pressure balanced with the other working media in order not to exert pressure on the sealing interface, pressure balancing passage 22 is provided to allow pressure communication between space 21 and fluid chamber 25. A non-flowing but pressure transmitting viscous medium such as (for example) a highly viscous grease is interposed in passage 22 in order that space 21 and chamber 25 do not physically communicate, but only reach a pressure balance via the interposed column of viscous medium.

Figure 3:
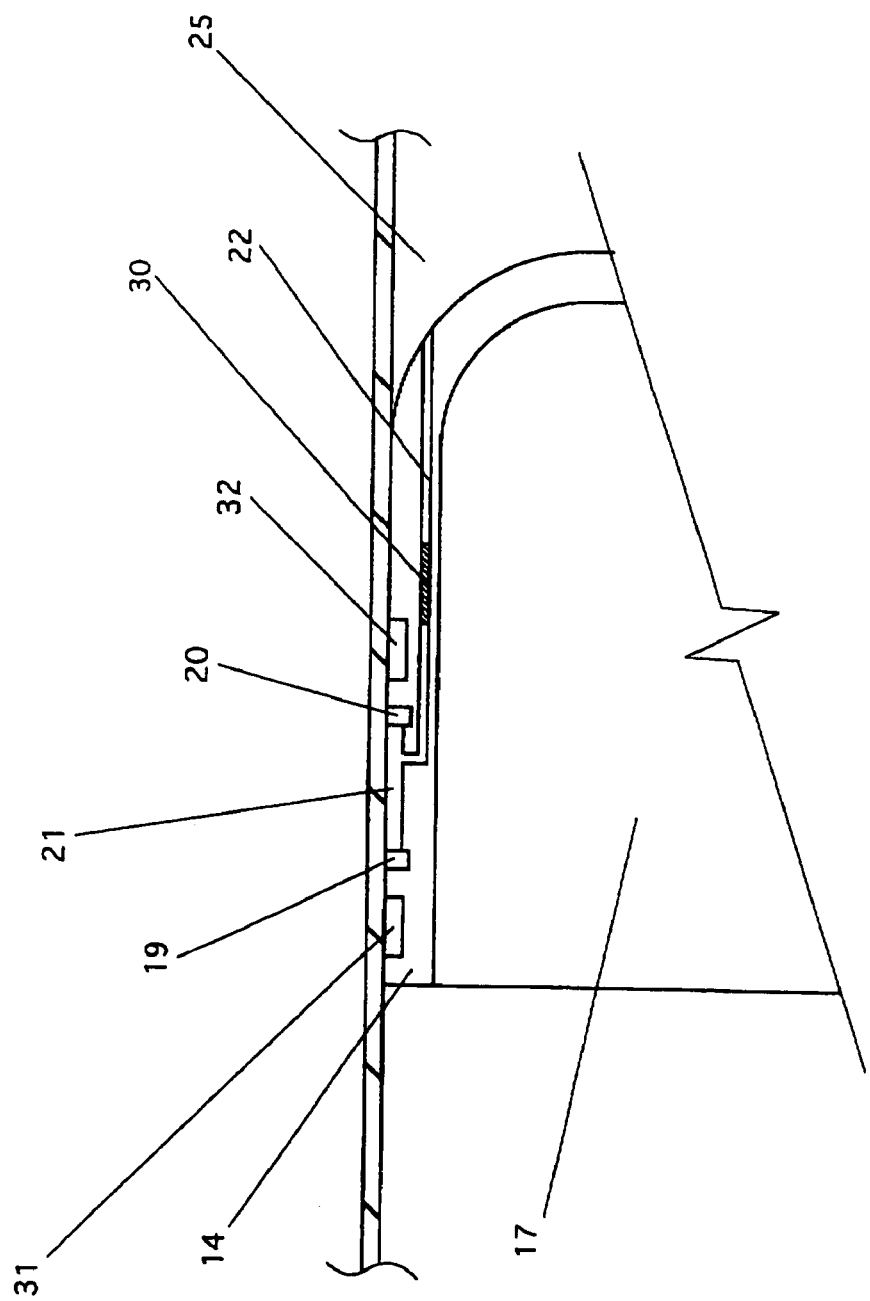
FIG. 3 depicts another embodiment of the invention, in which the double seal is pressure balanced by a channel that contains an inline free piston instead of grease.

FIG. 3 depicts yet another embodiment that employs a similar pressure balancing dual seal. In this embodiment, pressure balancing piston 30 is interposed in passage 22 instead of the viscous medium means employed in the previous embodiment, and similarly acts to prevent physical contact between media in space 21 and chamber 25 while providing for pressure balancing between the two.

Figure 4:
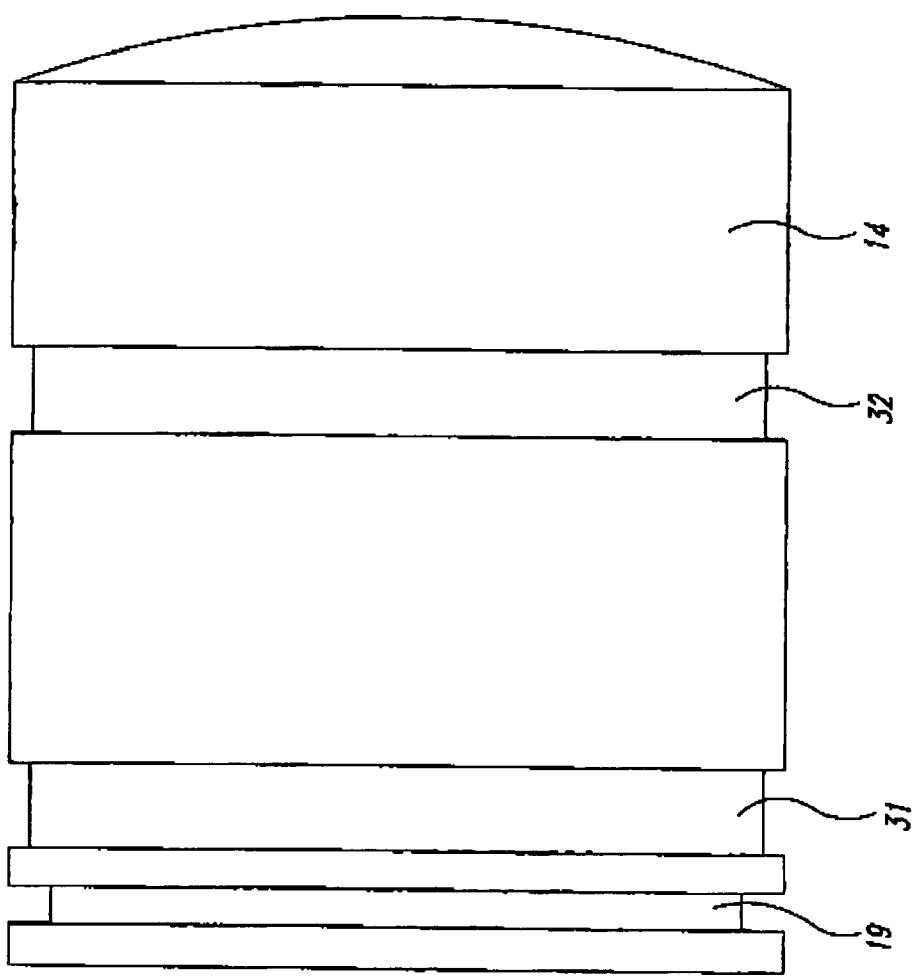
FIG. 4 shows an alternative piston embodiment for the present invention, with both bearings on the same (oil) side of the piston seal.

FIG. 4 depicts a third embodiment of the piston for use with the present invention. In this embodiment, bearings 31 and 32 are both located on the same side of the piston seal 19, preferably toward the fluid (oil) chamber's side of piston seal 19. By placing both bearings on the oil side of piston seal 19, both bearings will stay fully lubricated by the fluid (oil) from chamber 25 in operation, and therefore may reduce wear and debris formation that can otherwise result over time with use of a dry bearing.

The arrangements for the present invention set forth above provide several advantages over the prior art as discussed above, and as additionally explained below.

Because relatively incompressible fluid rather than gas now resides in the interstitial space 16 between the sleeve 13 and the vessel wall 10 in the present invention, the forces exerted on the sleeve 13 as fluid flows around it in this restricted space will be smaller and more uniform. In the prior art, due to the compressibility of gas relative to liquid, having gas reside on the outside of the sleeve increased the forces likely to act on the piston and sleeve assembly as gas flows through the interstitial space around the sleeve in response to rapid charging and discharging of the device, again leading to the need to make the sleeve thicker and more rigid than would otherwise be required for piston sealing only. This is avoided in the present invention: a smaller and more uniform volumetric flow is generated in such conditions. This reduces the required rigidity of the sleeve, allowing consideration of previously unsuitable materials for the sleeve, such as moldable polymers that are lower in cost, easier to manufacture, or provide superior sealing properties over the metal sleeves existing in the prior art.

The reduced stress acting on the sleeve 13 also alleviates the problem of retaining and centering the sleeve 13 within the vessel 10. Previous designs rigidly attach the fixed inner end of the cylindrical sleeve to the inner surface of one end of the vessel, thereby forming a cantilever-style connection with the end surface. This was done to provide sufficient retention and centering for the sleeve, and also causes the surface of the inner end of the vessel to serve as one wall of the chamber that will contain working medium within the sleeve. Because the present invention reduces stress on the sleeve, such a rigid connection is no longer necessary. Instead the sleeve 13 may be formed integrally with its own chamber end dome section and also integrally with the gas port 23 that supplies the chamber 24. This enables the sleeve 13 to be fixed within the vessel by inserting the sleeve unit within the socket for gas port 23, and reduces manufacturing effort and cost. Because the integral sleeve unit 13 does not need to be physically joined with an inner end surface of the vessel, it also helps enable use of vessels with a thoroughly composite construction. The effect of unit vibration on the fixed end of the sleeve 13 may also be reduced by allowing the thinner necked end portion of the sleeve unit to flex somewhat, thereby accommodating these forces without causing fatigue to a rigid joint.

In the present invention, the aforementioned reduced stresses on the sleeve also obviate the need to involve the pressure vessel walls 10 in the function of centering or reinforcing the sleeve 13. The use of composite materials for the pressure vessel construction now becomes more practical, because effective sleeve centering and retention is no longer dependent on resisting pressure-related changes in the vessel diameter.

These developments lead to additional advantages in design and fabrication. For example, the inner sleeve 13 may be very thin, because it need not support any substantial differential pressure, and thus may be inexpensively manufactured. The sleeve 13 may also be constructed of deformable material that is locally retained in a circular shape for sealing by a circular piston 14 as it moves longitudinally within the sleeve.

Additionally, the inner sleeve 13 may be fit relatively tightly into the outer pressure vessel 10 to maximize the potential storage space for the compressed gas and working volume for the accumulator size. Use of a thin sleeve fitting tightly within the pressure vessel (i.e., with minimum slip clearance between the sleeve and the pressure vessel's inside wall) at atmospheric assembly pressure is not done in the prior art. This is because gas is located on the outside of the sleeve in prior art, and a rapid discharge of oil from the interior of the sleeve would rapidly drop the accumulator pressure, and as the compressed gas in the annulus between the sleeve and pressure vessel wall dropped in pressure and expanded (i.e., flowed from the annulus), a significant pressure drop would develop from the sealed end of the annulus to the open end causing pressure loading on the sleeve. A larger separation with spacers is instead used in prior art, which allows the expanding gas to flow with minimum restriction. Moving the oil to the outside of the sleeve 13 as in the present invention avoids the need for spacing and spacers since oil is essentially incompressible and little flow from the annulus would occur, thus enabling a tight clearance and greater utilization of the inside volume of the pressure vessel.

As can be seen from the foregoing, various advantages may result from the present invention. For example, the invention is adaptable to service in mobile vehicles, is lightweight, and can be mass produced at low cost, while maintaining the low gas permeability properties of prior art piston accumulators. While particularly useful for high pressure accumulators for the reasons as discussed above, it will also be understood that the device of the present invention may be used for other purposes as well, including, for example, as a lower pressure accumulator for a wide variety of applications.

From the foregoing it will also be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An accumulator, comprising:
   a composite vessel body, comprising a cylindrical composite vessel wall and rounded composite vessel ends;
   a closeable fluid port positioned within one end of the vessel body, for communication with fluid sources external to the accumulator;
   a cylindrical nonpermeable sleeve, disposed within the vessel body and substantially concentric with the cylindrical composite vessel wall; and
   a piston slidably disposed within the cylindrical nonpermeable sleeve, separating the interior of said sleeve into a first chamber, containing a gas adapted to be compressed under pressure, and a second chamber, containing pressurized fluid in communication with the closeable fluid port and with an intervening volume between the cylindrical nonpermeable sleeve and the cylindrical vessel wall.

2. The accumulator of claim 1, wherein the cylindrical nonpermeable sleeve is configured to rest independently of radial movement of the vessel wall.

3. The accumulator of claim 2, wherein the cylindrical nonpermeable sleeve additionally comprises a flexing, fatigue-resistant end dome.

4. The accumulator of claim 2, wherein the cylindrical nonpermeable sleeve is made of a thin, non-metallic material.

5. The accumulator of claim 4, wherein a minimum slip clearance is provided between the cylindrical nonpermeable sleeve and the vessel wall.

6. The accumulator of claim 4, wherein the cylindrical nonpermeable sleeve is made of a deformable material and the piston is a circular shaping piston.

7. The accumulator of claim 1, wherein the first chamber additionally contains a foam.

8. The accumulator of claim 1, additionally comprising a fatigue-resistant plastic liner immediately adjacent to an interior side of the vessel body.

9. The accumulator of claim 1, additionally comprising a charge gas port positioned within a second end of the vessel body.

10. The accumulator of claim 1, wherein the composite vessel body is gas permeable at high pressures.

11. The accumulator of claim 1, additionally comprising a first annular seal on the piston to minimize potential communication between the first chamber and the second chamber.

12. The accumulator of claim 11, additionally comprising a second annular seal on the piston to eliminate potential communication between the first chamber and the second chamber.

13. The accumulator of claim 12, additionally comprising a pressure-balancing means for balancing pressure between the first annular seal and the second annular seal.

14. The accumulator of claim 11, additionally comprising two annular bearings on the piston, both located between the first annular seal and the second chamber.

15. A method of precharging a high pressure piston-in-sleeve accumulator for use, comprising:

introducing low pressure fluid into a piston-in-sleeve accumulator through a fluid port in a vessel body of the piston-in-sleeve accumulator, thereby filling with fluid a first chamber and an interstitial space, between an internal piston sleeve and a vessel wall, of the piston-in-sleeve accumulator;

filling with compressed gas a second chamber of the piston-in-sleeve accumulator through a charge port in the vessel body of the accumulator, causing the fluid port to close responsive to the fluid in the first chamber falling to a predesignated level; and closing the charge port.

* * * * *